United States Patent [19]
Kubota

[11] Patent Number: 5,305,432
[45] Date of Patent: Apr. 19, 1994

[54] LINE SEGMENT DEPICTING SYSTEM FOR A DISPLAY IMAGE MEMORY

[75] Inventor: Kazuhiro Kubota, Tokyo, Japan
[73] Assignee: NEC Corporation, Tokyo, Japan
[21] Appl. No.: 939,509
[22] Filed: Sep. 4, 1992
[30] Foreign Application Priority Data
  Sep. 4, 1991 [JP]  Japan .................................. 3-223245
[51] Int. Cl.⁵ .............................................. G06F 15/62
[52] U.S. Cl. .................................... 395/143; 395/142; 345/136
[58] Field of Search .............................. 395/140–143, 395/129, 132; 340/739, 744; 345/135, 136

[56] References Cited
U.S. PATENT DOCUMENTS 4,593,372  6/1986  Bandai et al. .................... 395/132 X
4,623,880  11/1986  Bresenham et al. ............ 340/744 X
5,028,848  7/1991  Bankston et al. ................ 340/739 X

*Primary Examiner*—Heather R. Herndon
*Assistant Examiner*—Almis Jankus
*Attorney, Agent, or Firm*—Whitham & Marhoefer

[57] ABSTRACT

A line segment depicting system includes an error discrimination condition memory for designating for each octant an error discrimination condition applied when a DDA (Digital Differential Analyzer) error item is 0.5. First and second different error discrimination conditions are set in the condition memory for first to fourth octants, and for fifth to eighth octants, respectively. A data processing unit receives information of a given line segment and determines in which octant the given line segment is included, and the result of determination is stored in an octant memory, which controls a selector for selecting one of outputs of the error discrimination condition memory. The data processing unit also supplies a DDA parameter to a DDA unit, which sequentially generates a coordinate value ($X_n$, $Y_n$) of dot positions of an approximate line segment with reference to the error discrimination condition supplied through the selector from the error discrimination condition memory.

5 Claims, 6 Drawing Sheets

LINE SEGMENT DEPICTING SYSTEM FOR A DISPLAY IMAGE MEMORY

BACKGROUND OF THE INVENTION

1. Field of the invention

The present invention relates to a digital image processing system, and more specifically to a system for depicting a line segment on a display image memory.

2. Description of related art

A conventional line segment depicting system will be described with reference to the accompany drawing.

FIG. 1A shows an ideal line segment defined on a fine two-dimensional coordinate plane, and FIG. 1B shows an approximate line segment obtained by developing the line segment of FIG. 1A onto a discrete coordinate grid. A display memory is deemed as being a two-dimensional plane based on a discrete coordinate system. Therefore, in order to depict a line segment on the display, it is necessary to develop or convert the ideal line segment of FIG. 1A to the approximate line segment of FIG. 1B. This means that when the approximate line is a deemed as being a collection or set of dots, a dot string $\{X_N, Y_N\}$ on the discrete coordinate system is obtained.

More specifically, an integer coordinate system is introduced as the discrete coordinate system of FIG. 1B. The following is one typical conventional method for developing the ideal line segment of FIG. 1A given with a start point coordinate $(X_S, X_Y)$ and an end point coordinate $(X_E, Y_E)$ in order to uniquely define the line segment on the coordinate plane, onto the integer coordinate system as shown in FIG. 1B.

First, the ideal line is classified into eight kinds, on the basis of an angle $\alpha$ between a directional vector of the ideal line segment and a direction of $+X$. As shown in FIG. 2, th value of $\alpha$ is divided in units of 45 degrees. For example, if $0° \leq \alpha < 45°$, the ideal line segment is called as a "line segment whose directional vector included in a first octant". Similarly, if $45° \leq \alpha < 90°$, the ideal line segment is called as a "line segment whose directional vector included in a second octant". Therefore, all ideal line segments having a length of 2 or more are included in any of first to eight octants. However, in order to determine in which octant the ideal line is included, it is not necessary to actually calculate the angle $\alpha$. It is possible to classify the line segment, by discriminating a positive/negative sign of three equations: $X_E - X_S$, $Y_E - Y_E - Y_S$, and $(X_E X_S) - (Y_E - Y_S)$.

Here, the line segment included in the first, fourth, fifth or eighth octant will be called as an "X-major line segment", and the line segment included in the second, third, sixth or seventh octant will be called as a "Y-major line segment". In addition, in the X-major line segment, an X component will be called a "major component" and a Y component will be called a "minor component". In the Y-major line segment, an X component will be called a "minor component" and a Y component will be called a "major component".

Now, a process to sequentially obtain each point coordinate $(X_n, Y_n)$ of the dot string $\{X_N, Y_N\}$ on the integer coordinate system as the approximate line segment will be described with reference to FIG. 3. FIG. 3 illustrates an example of a line segment included in the first octant. The ideal line segment shown in FIG. 3 is sampled at each coordinate point of the integer X coordinate. Here, it is assumed that a preceding sampling point is $(X_{n-1}, Y_{n-1})$ and a current sampling point is $(X_n, Y_n)$. For the current sampling point C, a fraction of the Y coordinate value Yr, namely, an error between the ideal line segment and the approximate line segment is sought. If the error is less than 0.5, it is deemed that $Y_n = Y_{n-1}$. If the error is not less than 0.5, it is deemed that $Y_n = Y_{n-1} + 1$. This means that an integer coordinate point $(X_n, Y_n)$ nearest to $(X_n, Y_r)$ is obtained. In FIG. 3, a point A and another point B are shown as an integer coordinate point near to $(X_n, Y_r)$, but since the error is not less than 0.5, $Y_n = Y_{n-1} + 1$ is adopted. Namely, the point A is selected.

The recurrence formula of the major component is ceaselessly $X_n = X_{n+1}$. On the other hand, the recurrence formula of the minor component is either $Y_n = Y_{n-1}$ or $Y_n = Y_{n-1} + 1$, depending upon the value of the error. In ordinary cases, a threshold value of the error is set to 0.5, so that if the error is less than 0.5, $Y_n = Y_{n-1}$ is selected, and if the error is not less than 0.5, $Y_n = Y_{n-1} + 1$ is selected. The latter will be called as "carry-up by DDA error item". In other words, if there is no carry-up by DDA error item, the minor component will not change, and if the error item changes, the minor component will change.

The above is an explanation about X-major line segment included in the first octant. In the cases of other octants, the recurrence formula is somewhat different. The following table shows a relation of each octant and the associated recurrence formula

TABLE 1

| Octant | Increment/decrement of major component | Increment/decrement of minor component when DDA error item is carried up |
|---|---|---|
| 1st octant | $X_n = X_{n-1} + 1$ | $Y_n = Y_{n-1} + 1$ |
| 2nd octant | $Y_n = Y_{n-1} + 1$ | $X_n = X_{n-1} + 1$ |
| 3rd octant | $Y_n = Y_{n-1} + 1$ | $X_n = X_{n-1} - 1$ |
| 4th octant | $X_n = X_{n-1} - 1$ | $Y_n = Y_{n-1} + 1$ |
| 5th octant | $X_n = X_{n-1} - 1$ | $Y_n = Y_{n-1} - 1$ |
| 6th octant | $Y_n = Y_{n-1} - 1$ | $X_n = X_{n-1} - 1$ |
| 7th octant | $Y_n = Y_{n-1} - 1$ | $X_n = X_{n-1} + 1$ |
| 8th octant | $X_n = X_{n-1} + 1$ | $Y_n = Y_{n-1} - 1$ |

The line segments included in the first, fourth, fifth and eighth octants are the X-major line segments, and the line segments included in the second, third, sixth and seventh octants are the Y-major line segments. In the case of the Y-major line segment, the line segment is sampled on the basis of the integer Y coordinate, and the X coordinate value Xr at each sampling point is obtained so that the nearest integer coordinate point $(X_n, Y_n)$ is obtained.

The above mentioned method is called a DDA (Digital Differential Analyzer), and is one of the most general methods for depicting a line segment in a discrete XY coordinate system such as in a display memory. In practice, the DDA using the integer type Bresenham algorithm in which the fraction discrimination is placed with an integer sign discrimination is used. The DDA and the integer type Bresenham algorithm are described in detail in "Procedural Elements for Computer Graphics" by David F. Rogers.

In the above mentioned conventional line segment depicting system, when an ideal line segment having a sampling point having the error of 0.5 is converted into an approximate line, the following problem has been encountered. An approximate line obtained by putting the start point and the end point at $(X_S, Y_S)$ and at $(X_E, Y_E)$, respectively, is not consistent with another approximate line obtained by putting the start point and the end point at $(X_E, Y_E)$ and at $(X_S, Y_S)$, respectively.

The problem will specifically be explained with reference to FIG. 4. FIG. 4A illustrates, by black dots, an approximate line having the start point of $(-2, -1)$ and the end point of $(6, 3)$. approximate line is obtained by using a DDA mechanism adopting an error discrimination condition that when the error item is not less than 0.5, the carry-up is performed. On the other hand, FIG. 4B illustrates, by black dots, an approximate line having the start point of $(6, 3)$ and the end point of $(-2, -1)$, which is obtained by the same DDA mechanism. As seen from comparison between FIGS. 4A and 4B, the solid line of FIG. 4B is a simple replacement of the start point and the end point of the solid line of FIG. 4A by the end point and the start point, respectively, but the black dot patterns of FIG. 4A and 4B are not consistent. This means that the trace of the approximate line depicted or stored in the display memory is different. The line segment on the two-dimensional plane should be uniquely determined on the basis of two opposite ends of the line segment, without changing by exchanging the start point and the end point. However, if the trace of the approximate line depicted or stored in the display memory becomes different by exchanging the start point and the end point for the end point and the start point, respectively, an excessive load is given on a graphic software.

The above mentioned error discrimination condition is that when the error item is not less than 0.5, the carry-up is performed. However, the problem similarly occurs even if the error discrimination condition is changed to that when the error item is greater than 0.5, the carry-up is performed. In the case that the error item is greater than 0.5, the carry-up is performed, FIG. 4A illustrates an approximate line having the start point of $(6, 3)$ and the end point of $(-2, -1)$, and FIG. 4B illustrates an approximate line having the start point of $(-2, -1)$ and the end point of $(6, 3)$. Similarly, the depicted traces are not consistent.

In order to make the depicted traces on the display memory consistent, the following method has been proposed in the prior art. Namely, a line segment depicting system has been configured such that the error discrimination condition can be selected from two different conditions: a first error discrimination condition that when the error item is not less than 0.5, the carry-up is performed and a second error discrimination condition that when the error item is greater than 0.5, the carry-up is performed. However, in any case, it is necessary to discriminate in which octant a given line segment is included, by means of a graphic software, so that it is determined which of the two error discrimination conditions should be used for depicting the approximate line segment. This discrimination has to be performed for each line segment, and the result of the determination has to be notified to the line segment depicting apparatus. Therefore, the depicting speed lowers inevitably.

SUMMARY OF THE INVENTION

Accordingly, it is an object of the present invention to provide a system for depicting a line segment on a display image memory which has overcome the above mentioned defect of the conventional one.

Another object of the present invention is to provide a system for depicting a line segment on a display image memory, which has a high line segment depicting speed.

The above and other objects of the present invention are achieved in accordance with the present invention by a line segment depicting system comprises:

a display memory including a number of memory cells for storing an image information corresponding to, in one-to-one relation, a discrete coordinate point $(X_N, Y_N)$ positioned at equal intervals on a two-dimensional plane;

a depicting unit for reading and writing a memory cell at any location in the display memory, the depicting unit capable of designating a position of the memory cell to be read/written by using the discrete coordinate point $(X_N, Y_N)$;

a data processing unit receiving from an data processing system a start point coordinate and an end point coordinate for defining a line segment on the two-dimensional plane, the data processing unit generating a DDA parameter and determining in which of at least partial areas the directional vector of the line segment is included, the at least partial areas being obtained by dividing the two-dimensional plane by at least one straight line passing through the origin of the two-dimensional plane;

an error discrimination condition memory for storing one of first and second error discrimination conditions in such a manner that one error discrimination condition is stored for each one of the at least two partial areas, the first error discrimination condition being that when a DDA error item is not less than 0.5, a carry-up is performed, and the second error discrimination condition being that when the DDA error item is greater than 0.5, a carry-up is performed, the error discrimination condition memory being set by the data processing system;

a partial area memory connected to the data processing unit for storing a partial area which is determined by the data processing unit and in which the directional vector of the line segment is included;

a selector controlled by an output of the partial area memory so as to select one of error discrimination conditions stored in the error discrimination condition memory; and a DDA unit receiving the DDA parameter generated by the data processing unit so as to sequentially calculate a coordinate (Xn, Yn) of each dot position of an approximate line segment on a discrete coordinate system, the DDA unit determining the coordinate (Xn, Yn) of the dot position in accordance with the error discrimination condition supplied through the selector when the DDA error item becomes 0.5.

The above and other objects, features and advantages of the present invention will be apparent from the following description of preferred embodiments of the invention with reference to the accompanying drawings.

DESCRIPTION OF THE PREFERRED EMBODIMENTS

Figure 1A:
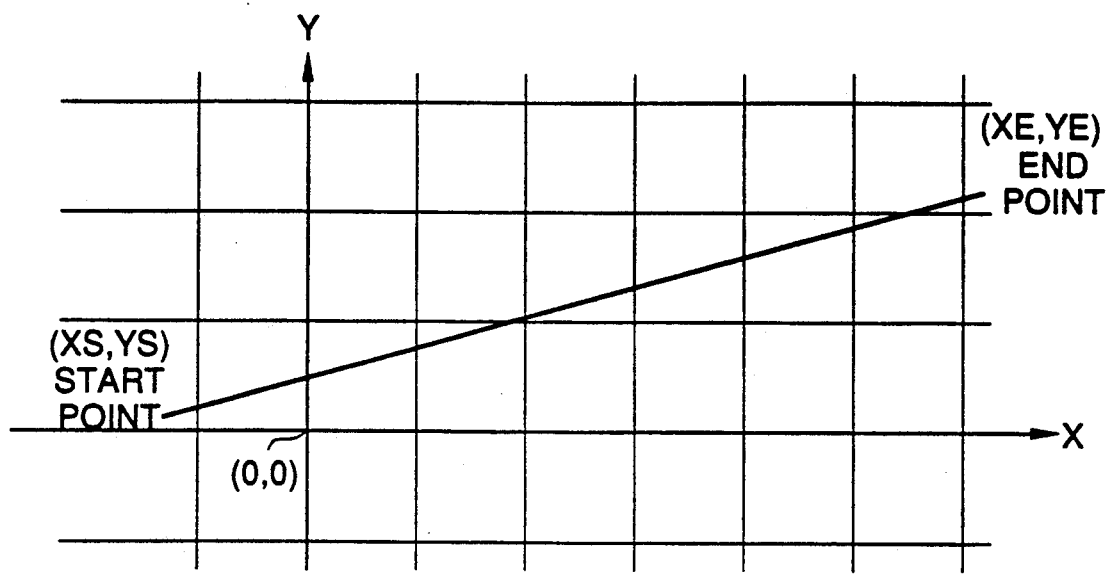
FIGS. 1A and 1B illustrate an ideal line segment in a fine XY coordinate plane, and an approximate line segment obtained by converting the ideal line segment onto a discrete XY coordinate plane.
Figure 1B:
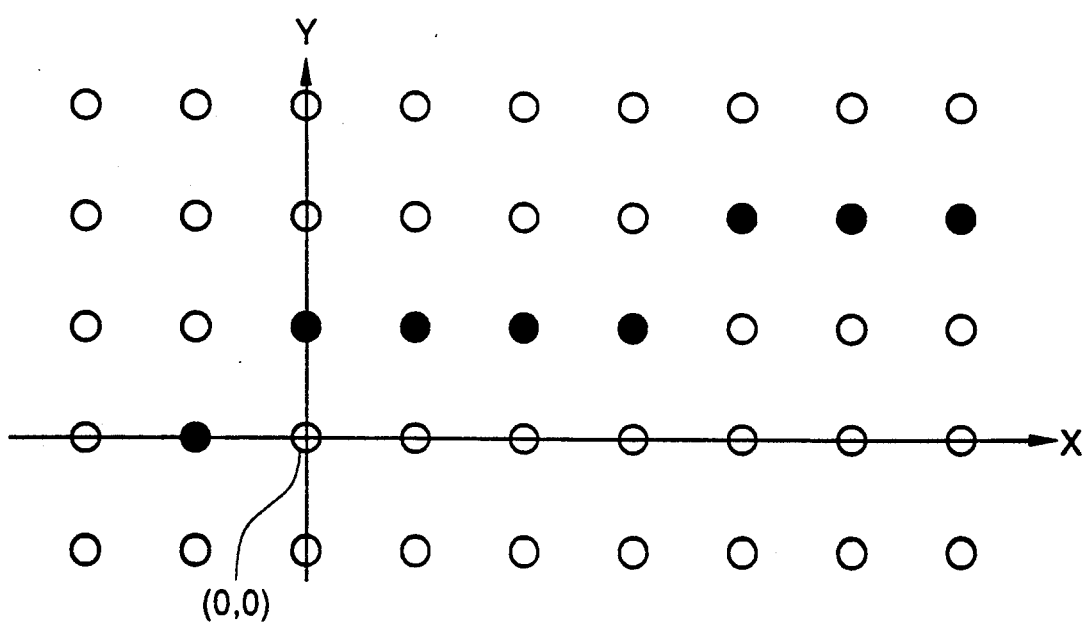
Figure 2:
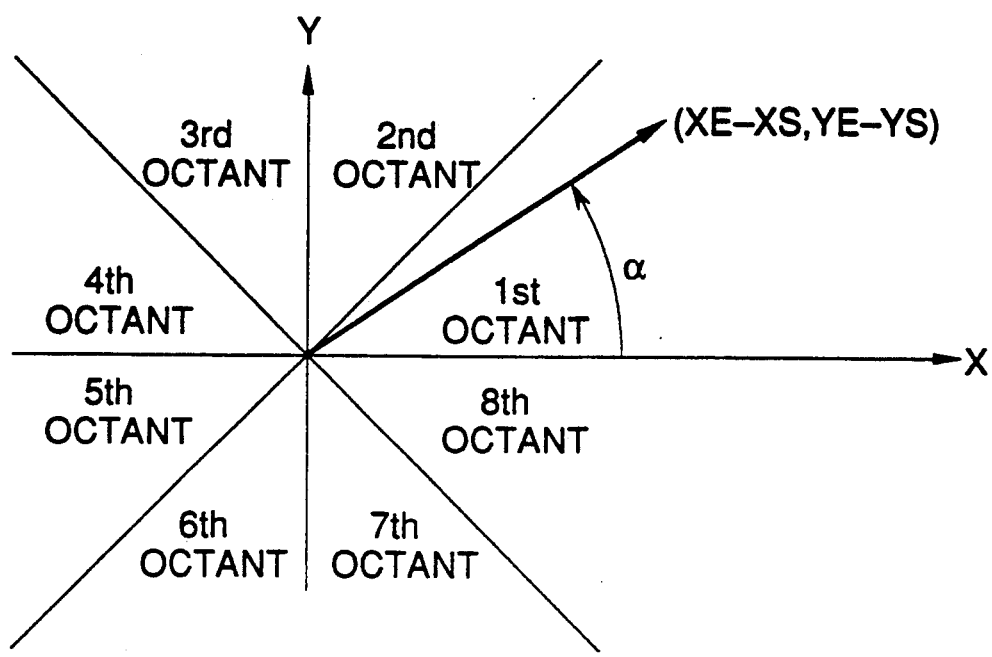
FIG. 2 illustrates eight octants for classifying a given line segment by its directional vector.
Figure 3:
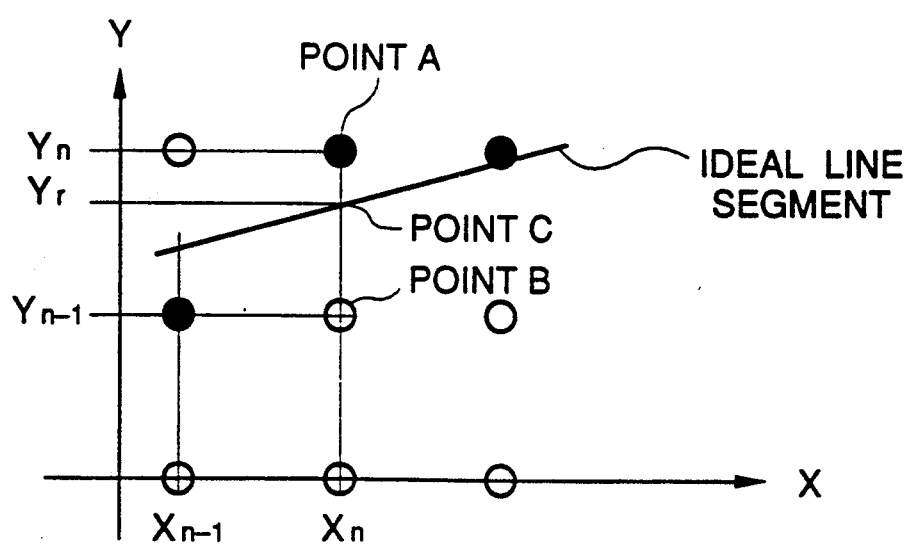
FIG. 3 illustrates a process of sequentially obtaining a series of integer coordinate points approximating the ideal line segment, by use of the DDA mechanism.
Figure 4A:
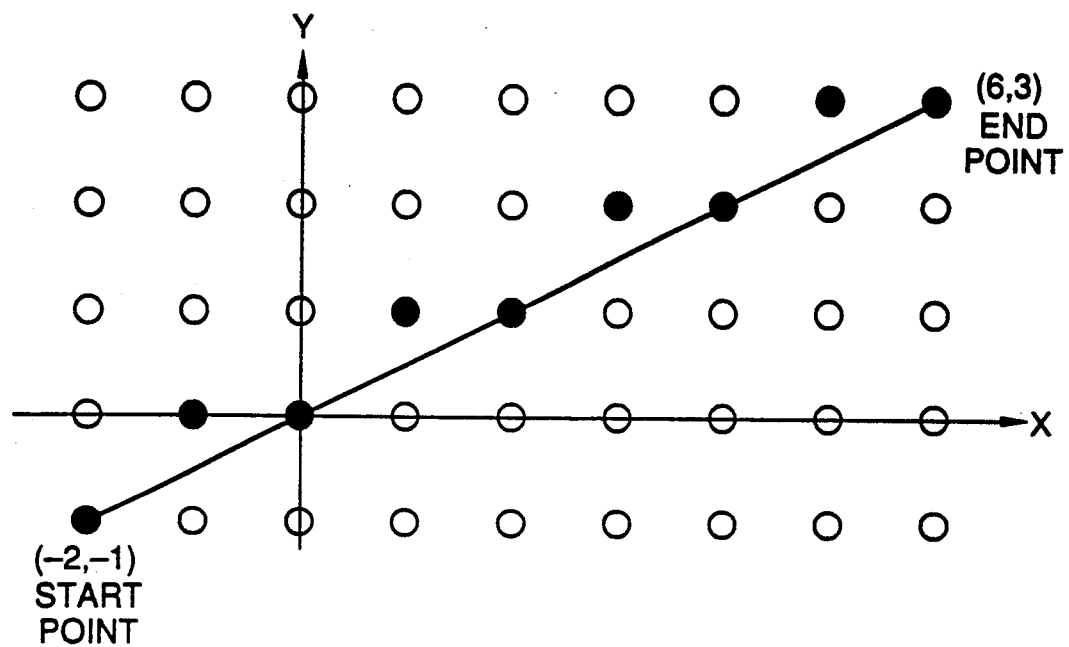
FIGS. 4A and 4B illustrate an ideal line segment of the start point (−2, −1) and the end point (6, 3) and its approximate line segment, and the ideal line segment of the start point (6, 3) and the end point (−2, −1) and its approximate line segment, respectively.
Figure 4B:
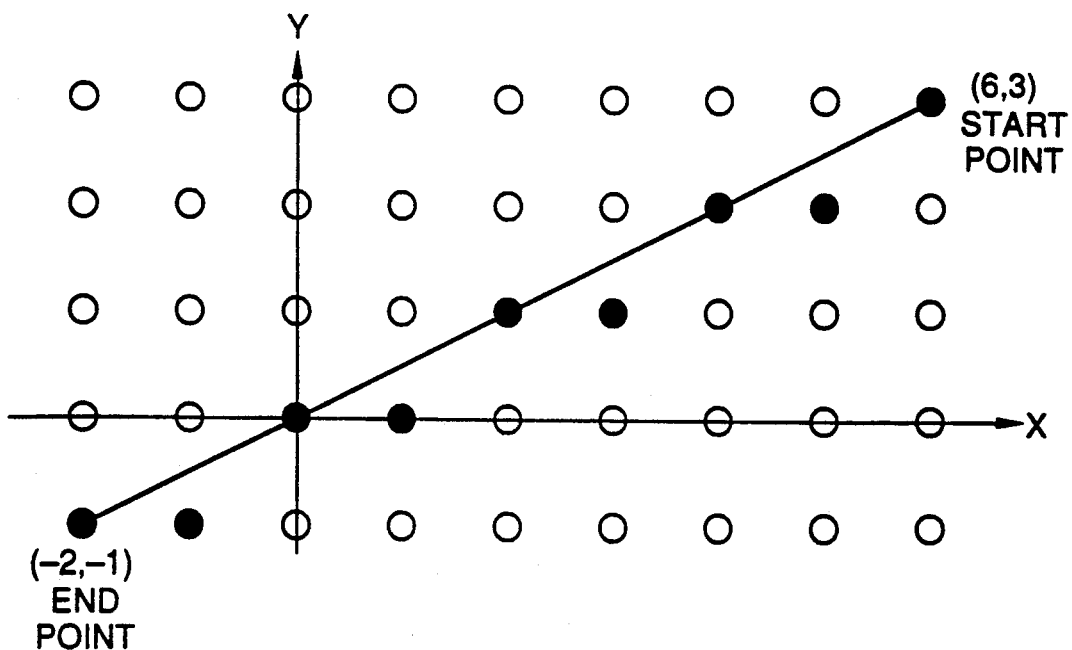
Figure 5:
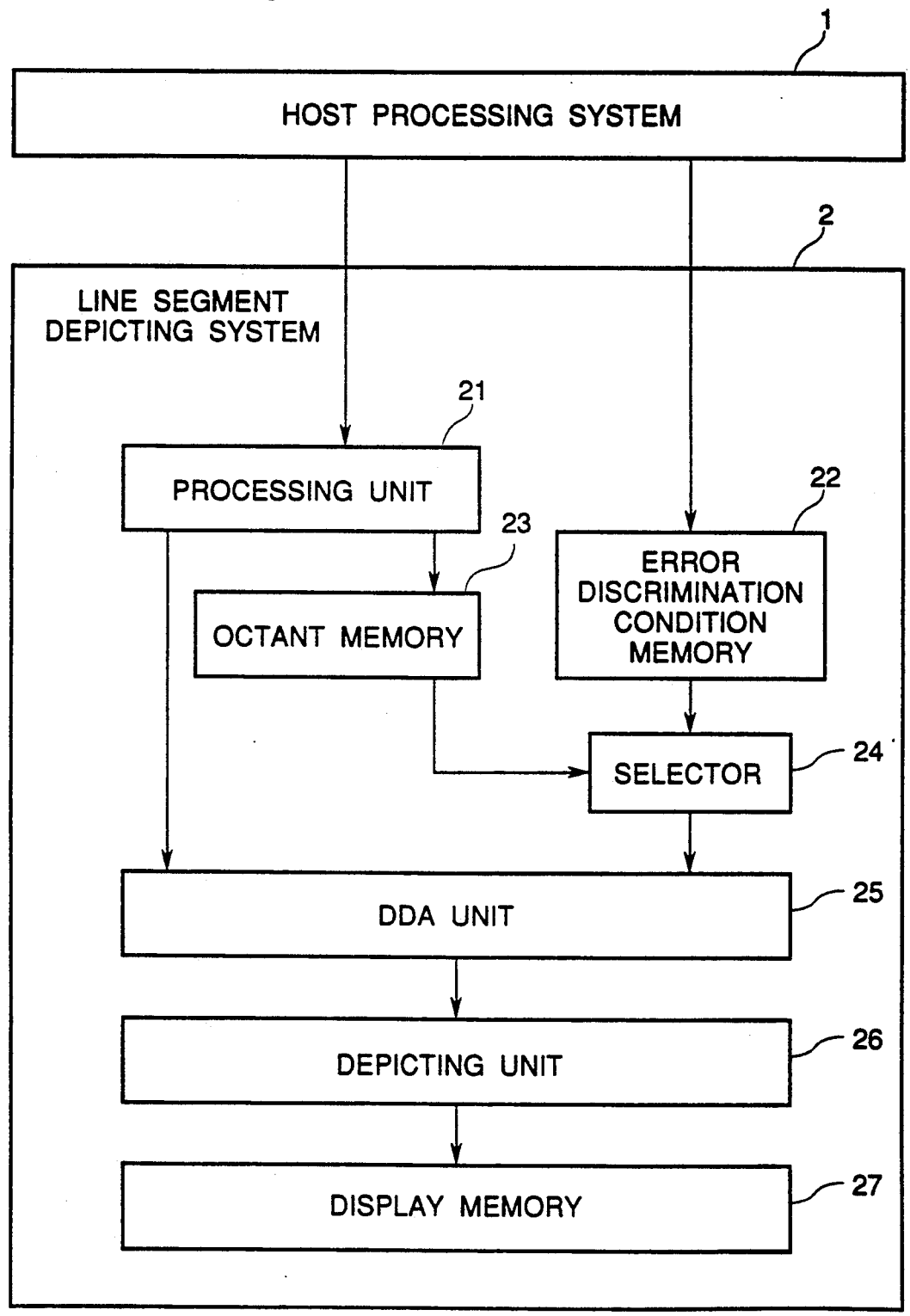
FIG. 5 is a block diagram of an embodiment of the line segment depicting system in accordance with the present invention.

Referring to FIG. 5, there is shown a block diagram of an embodiment of the line segment depicting system in accordance with the present invention.

The shown system includes a host processing system 1 for controlling a line segment depicting system 2, which includes a processing unit 21, an error discrimination condition memory 22, an octant memory 23, a selector 24, a DDA unit 25, a depicting unit (memory access control unit) 26 and a display memory 27, connected as shown.

The processing unit 21 receives from the host processing system, a start point and an end point of a line segment to be depicted in the display memory, and analyzes the coordinate values of the received points so as to discriminate in which of the eight octants the line segment is included. The result of processing is stored in the octant memory 23, and thereafter, the processing unit 21 sends the start point coordinate and DDA parameter to the DDA unit 25.

The error discrimination condition memory 22 is a 8-bit register, and a first bit to an eighth bit of the register correspond to the first octant to the eighth octant, respectively. When the bit is at a value "1", the error discrimination condition is that when the error item is not less than 0.5, the carry-up is performed. When the bit is at a value "0", the error discrimination condition is that when the error item is greater than 0.5, the carry-up is performed. In order to make a given approximate line segment consistent with another approximate line segment obtained by exchanging the start point and the end point of the given approximate line segment for the end point and the start point, respectively, it is necessary to make an error discrimination condition for a given octant, opposite or reverse to an error discrimination condition for another octant positioned in symmetry to the given octant with relation to the origin of the coordinate axes. For example, the bits of the error discrimination condition memory 22 are set by the host processing system to the effect that when an approximate line segment included in the first, second, third or fourth octants is depicted, the error discrimination condition is that when the error item is not less than 0.5, the carry-up performed is, and when an approximate line segment included in the fifth, sixth, seventh or eighth octants is depicted, the error discrimination condition is that when the error item is greater than 0.5, the carry-up is performed.

The octant memory 23 stores in which octant the approximate line segment to be depicted is included. An output of the octant memory 23 is supplied to the selector 24, so as to select one bit of the 8 output bits of the error discrimination condition memory 22. The selected one bit is outputted to the DDA unit 25, and designates the error discrimination condition to be used in the DDA unit 25.

The DDA unit 25 sequentially generates a coordinate point $(X_n, Y_n)$ for the approximate line segment, on the basis of the start point coordinate and the DDA parameter supplied from the processing unit 21 and with reference to the error discrimination condition designated through the selector 24.

The coordinate point $(X_n, Y_n)$ for the approximate line segment, sequentially generated by the DDA unit 25, is supplied to the depicting unit (memory access control unit) 26. On the basis of the received coordinate point $(X_n, Y_n)$, this depicting unit 26 writes a corresponding memory cell of the display memory 27. Here, the display memory 27 includes a number of memory cells for storing an image information corresponding to, in one-to-one relation, a discrete coordinate point $(X_N, Y_N)$ positioned at equal intervals on a two-dimensional plane. The depicting unit 26 is capable of designating a position of the memory cell to be read/written by using the discrete coordinate point $(X_N, Y_N)$ so that the depicting unit 26 can read and write a memory cell at any location in the display memory 27.

Here, it will be proved that the trace of an approximate line segment having the start point (−2, −1) and the end point (6, 3) generated by the above mentioned system is consistent with the trace of an approximate line segment having the start point (6, 3) and the end point (−2, −1) generated by the above mentioned system. First, the former depicting trace will be examined, and then, the latter depicting trace will be examined.

Figure 6A:
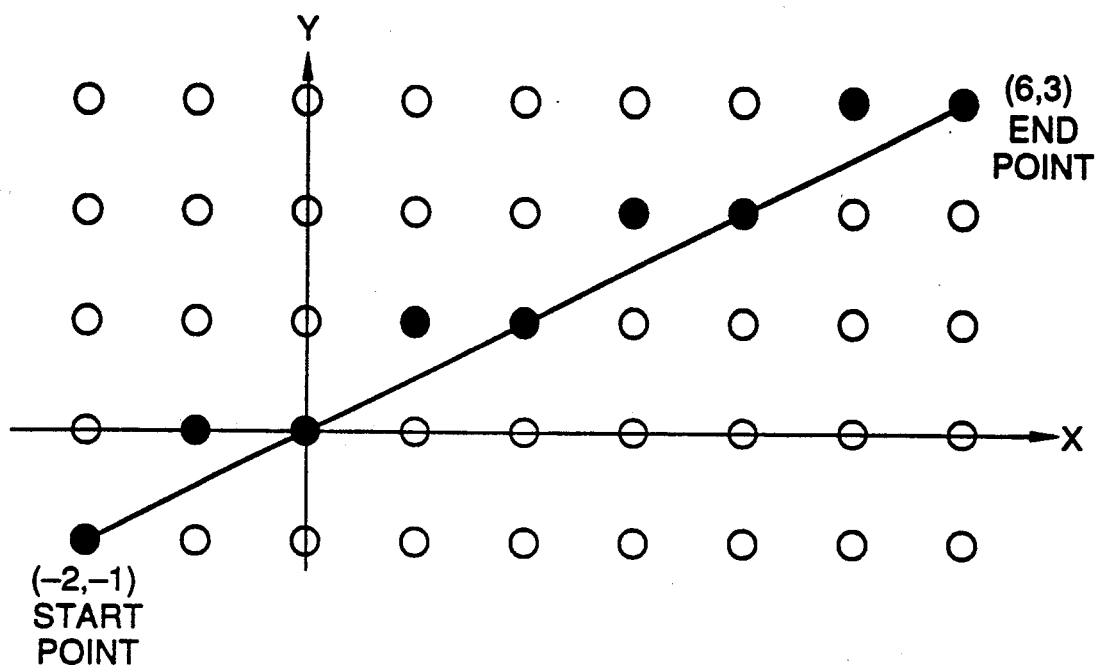
FIGS. 6A, 6B, 7A and 7B illustrate approximate line segments depicted on the integer XY coordinate system by the line segment depicting system in accordance with the present invention.

FIG. 6A illustrates that an approximate line segment having the start point (−2, −1) and the end point (6, 3) is depicted on the display memory by the above mentioned system. In this figure, dot shows a discrete point on the integer coordinate system, and a black dot designates a point to be depicted and a white dot indicates a point not to be depicted. A solid line connecting between the start point (−2, −1) and the end point (6, 3) shows an ideal line.

An approximate line segment obtained by developing this ideal line segment is expressed by a series of coordinate points {(−2, −1), (−1, 0), (0, 0), (1, 1), (2, 1), (3, 2), (4, 2), (5, 3) and (6, 3)}. A process for obtaining each of these coordinate points will explained in the following:

The processing unit 21 analyzes the start point $(X_S, Y_S)$ and the end point $(X_E, Y_E)$, and discriminates that this line segment is included in the first octant. This analysis and discrimination is completed by three large-and-small comparison operations: an X direction length $(X_E-X_S)$ of the ideal line segment, a Y direction length $(Y_E-Y_S)$ of the ideal line segment, and a difference between the X direction length absolute value and the Y direction length absolute value $\{|X_E-X_S| - |Y_E-Y_S|\}$. If the result of this comparison is compared with the following table, the octant in which the ideal line is included can be known.

TABLE 2

| $X_E$-$X_S$ | $Y_E$-$Y_S$ | $|X_E$-$X_S| - |Y_E$-$Y_S|$ | Octant |
|---|---|---|---|
| + | + | + | 1st octant |
| + | + | − | 2nd octant |
| − | + | − | 3rd octant |
| − | + | + | 4th octant |
| − | − | + | 5th octant |
| − | − | − | 6th octant |
| + | − | − | 7th octant |

TABLE 2-continued

| $X_E-X_S$ | $Y_E-Y_S$ | $|X_E-X_S| - |Y_E-Y_S|$ | Octant |
| --- | --- | --- | --- |
| + | − | + | 8th octant |

As seen from the above, it will be understood that the ideal line segment having the start point (−2, −1) and the end point (6, 3) is included in the first octant. This information is stored in the octant memory 23, and the selector 24 is controlled by the content of the octant memory 23 so as to select the error discrimination condition bit for the first octant among the 8 output bits of the error discrimination condition memory.

Next, the processing unit 21 supplies the start coordinate and the DDA parameter to the DDA unit 25, and causes the DDA unit 25 to start its operation. Since the ideal line segment is included in the first octant, namely, since the ideal line segment is the X-major line segment, the DDA unit 25 samples the ideal line segment on the basis of the integer X-coordinate. The coordinate of a dot position at each sampling point is (−2, −1), (−1, −0.5), (0, 0), (1, 0.5), (2, 1), (3, 1.5), (4, 2), (5, 2.5) and (6, 3). These dot positions are 9 in total. Of the 9 dot position coordinates, the first, third, fifth, seventh and ninth dot positions are at an integer coordinate point, and therefore, the coordinate value of these dot positions are supplied to the depicting unit 26 without modification. For the second, fourth, sixth and eighth dot positions, the Y coordinate value of the dot position has a fraction of 0.5. Therefore, the error discrimination condition for the first octant that when the error item is not less than 0.5, the carry-up is performed, is applied for these dot positions, so as to obtain the integer coordinate point nearest to each of (−1, −0.5), (1, 0.5), (3, 1.5), and (5, 2.5). Here, the second dot position of (−1, −0.5) will be examined. Because of the carry-up, a value obtained by adding "1" to the Y coordinate value of the just preceding dot position (first dot position) becomes the Y coordinate value of the second dot position. Namely, (−1, −0.5) is approximated to (−1, 0). Similarly, (1, 0.5), (3, 1.5), and (5, 2.5) are approximated to (1, 1), (3, 2) and (5, 3). Thus, the approximate line segment having the start point (−2, −1) and the end point (6, 3) has a depicting trace defined by the series of coordinate points {(−2, −1), (−1, 0), (0, 0), (1, 1), (2, 1), (3, 2), (4, 2), (5, 3) and (6, 3)}.

Figure 6B:
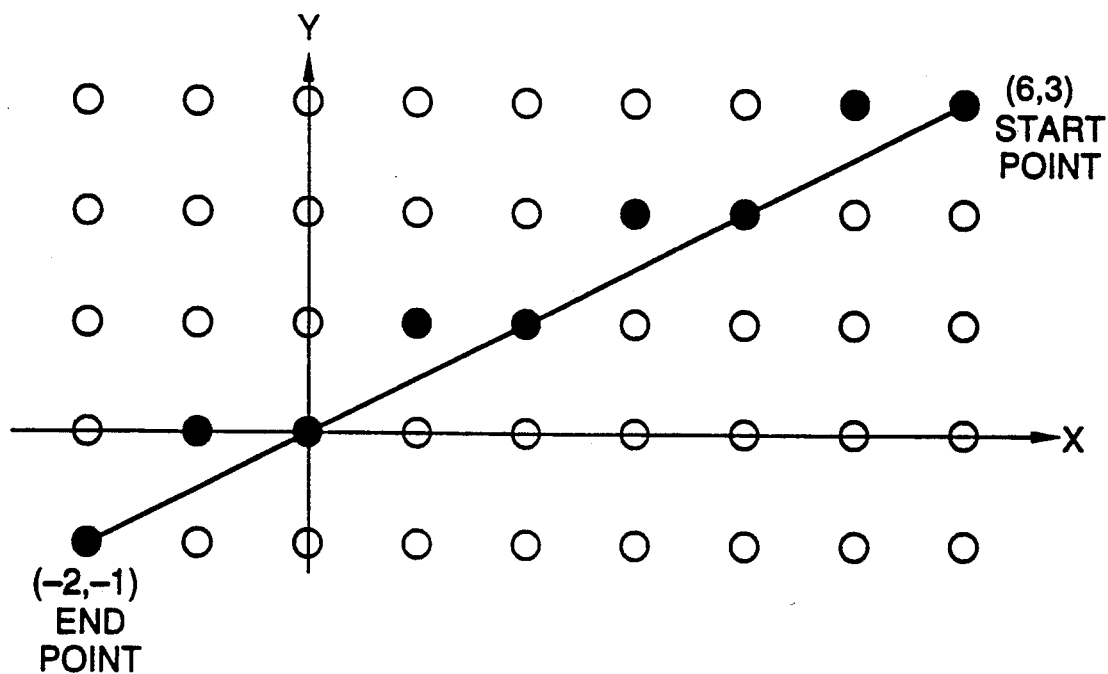

Next, a depicting trace of an approximate line segment having the start point (6, 3) and the end point (−2, −1) as shown in FIG. 6B will be examined. Similarly to the above mentioned line segment, the octant in which the line segment is included is determined. Namely, it can be judged that this line segment is included in the fifth octant. This is a matter of course, since the above mentioned line segment is included in the first octant and this line segment is one which is obtained by replacing the start point and the end point of the above mentioned line segment with the end point and the start point, respectively.

The coordinate of a dot position at each sampling point is (6, 3), (5, 2.5), (4, 2), (3, 1.5), (2, 1), (1, 0.5), (0, 0), (−1, −0.5) and (−2, −1). Similarly to the above mentioned line segment, the second, fourth, sixth and eighth dot positions are not positioned on an integer coordinate point. Therefore, the error discrimination condition for the fifth octant that when the error item is greater than 0.5, the carry-up is performed for these dot positions, so as to obtain the integer coordinate point nearest to each of (5, 2.5), (3, 1.5), (1, 0.5), and (−1, −0.5). However, since the error is 0.5, the carry-up is not performed. (5, 2.5), (3, 1.5), (1, 0.5), and (−1, −0.5) are approximated to (5, 3), (3, 2), (1, 1), and (−1, 0). Thus, the approximate line segment having the start point (6, 3) and the end point (−2, −1) has a depicting trace defined by the series of coordinate points {(6, 3), (5, 3), (4, 2), (3, 2), (2, 1), (1, 1), (0, 0), (−1, 0), and (−2, −1)}. Namely, this series of coordinate points is consistent with that for the approximate line segment having the start point (−2, −1) and the end point (6, 3).

As seen from the above, the approximate line segment having opposite ends of (6, 3) and (−2, −1) is only one. Namely, the trace of the approximate line segment is the same even if the start point and the end point of the approximate line segment is exchanged with the end point and the start point, respectively. This is because the error discrimination condition memory 22 is set to the effect that when an approximate line segment included in the first, second, third or fourth octants is depicted, the error discrimination condition that when the error item is not less than 0.5, the carry-up is performed, and when an approximate line segment included in the fifth, sixth, seventh or eighth octants is depicted, the error discrimination condition that when the error item is greater than 0.5, the carry-up is performed.

Figure 7A:
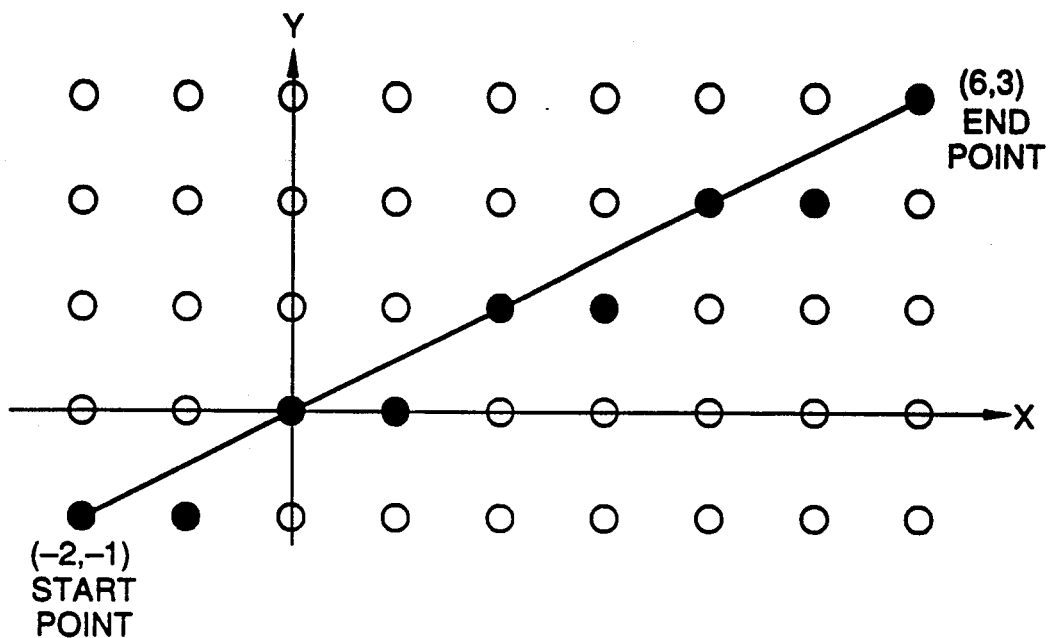
Figure 7B:
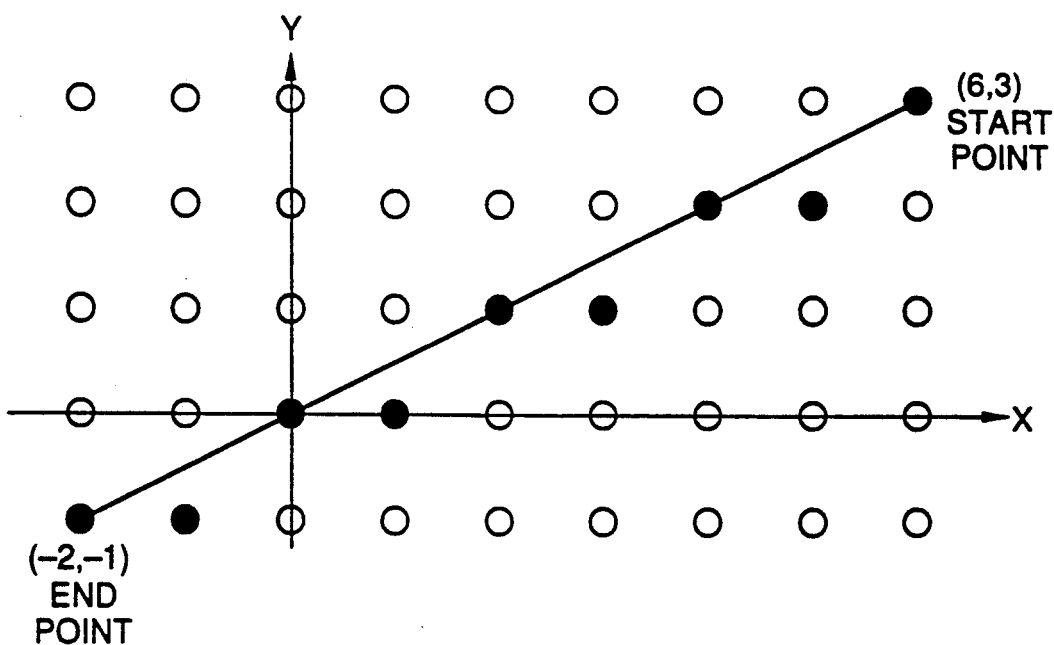

If the setting of the error discrimination condition memory 22 is modified to the effect that when an approximate line segment included in the first, second, third or fourth octants is depicted, the error discrimination condition that when the error item is greater than 0.5, the carry-up is performed, and when an approximate line segment included in the fifth, sixth, seventh or eighth octants is depicted, the error discrimination condition that when the error item is not less than 0.5, the carry-up is performed, a trace of an approximate line segment as shown in FIG. 7A and 7B can be obtained. In this case, the trace of the approximate line segment is the same even if the start point and the end point of the approximate line segment is exchanged with the end point and the start point, respectively.

As will be apparent from the above, according to the line segment depicting system of the present invention, since the graphics software of the host processing system become unnecessary to pay attention to the start point and the end point of the line segment, improvement of the line segment depicting speed can be expected. In addition, the line segment depicting system of the present invention has flexibility in which different depicting traces can be obtained by modifying only the set values of the error discrimination condition memory 22.

Here, the depicting speed will be examined quantitatively. In the conventional line segment depicting system, it is an ordinary practice for ensuring the consistency of the depicting trace, that the starting point Y coordinate and the end point Y coordinate are compared to determine a large-and-small relation therebetween, and the coordinate of the point which is smaller in the value of the Y coordinate is ceaselessly handled as being the start point, so that the coordinates of the start point and the end point are supplied to the line segment depicting system. In this case, the large-and-small comparison of the starting point Y coordinate and the end point Y coordinate and the exchange of the starting point and the end point on the basis of the result of the comparison are inserted extra. Here, it is assumed that one step is required for the large-and-small comparison of the starting point Y coordinate and the end point Y coordinate, one step is required for conditional branch on the basis of the result of the comparison. It is also assumed that two steps are required for the exchange of the starting point and the end point. Assuming that the exchange occurs at probability of 50%, one step is required at average for the exchange. Accordingly, the three steps in total are an extra step. In addition to these steps, an absolutely necessary step is a transfer of four parameters: the coordinates of the start point and the end point $X_S$, $Y_S$, $X_E$, $Y_E$, and one step is required for each transfer. Namely, four steps are required in total. Therefore, the conventional line segment depicting system requires seven steps for each one line segment, but the line segment depicting system in accordance with the present invention requires only four steps for each one line segment. In other words, the depicting speed of the line segment depicting system in accordance with the present invention is elevated at least 1.75 times the depicting speed of the conventional line segment depicting system.

In the above mentioned embodiment, the octants have been selected as a partial area in which the directional vector of the line segment. Here, the octants can be said to be at least two partial areas divided by at least one straight line passing through the origin of the coordinate axes. According this definition, the octants can be expressed in different words "eight partial areas divided by four straight lines passing through the origin of the coordinate axes: $X=0$, $Y=0$, $Y=X$, and $Y=-X$. In view of the essence of the present invention that the depicting trace of the approximate line does not change even if the start point and the end point are exchanged by each other, there is necessity of selecting the partial area as the octant. For example, it is sufficient if two partial areas divided by only one line passing through the origin of the coordinate axes: $Y=0$ is selected. In this case, the required bit number of the error discrimination condition memory 22 can be made to two. Nevertheless, the octants have been selected for the following two reasons:

The first reason is that attention is paid to symmetry of the depicted trace for each of the octants. When a circular arc is generated by the DDA system, if a minute interval on the circular line is considered, the arc can be expressed by a series of coordinate points, and therefore, it reaches the claimed invention. When the circle is generated by the DDA, there is a graphics software requiring a symmetry in relation to a straight line such as $X=0$, $Y=0$, $Y=X$, and $Y=-X$.

The second reason is to clearly show that an overhead for the octant calculating processing is not due to the present invention. In the case using the DDA, it is necessary to select one recurrence formula from eight recurrence formulas shown in Table 1. Namely, the processing for determining in which octant the line segment to be depicted is required, regardless of whether or not the present invention is utilized.

The invention has thus been shown and described with reference to the specific embodiments. However, it should be noted that the present invention is in no way limited to the details of the illustrated structures but changes and modifications may be made within the scope of the appended claims.

I claim:

1. A line segment depicting system comprises:

a display memory including a number of memory cells for storing image information corresponding to, in one-to-one relation, discrete coordinate points ($X_N$, $Y_N$) positioned at equal intervals on a two-dimensional plane;

a depicting unit for reading and writing memory cells at any location in said display memory, said depicting unit capable of designating a position in the memory cell to be read or written by using said discrete coordinate points ($X_N$, $Y_N$);

a data processing unit receiving from a data processing system a start point coordinate and an end point coordinate for defining a line segment on said two-dimensional plane, said data processing unit generating a Digital Differential Analyzer (DDA) parameter and determining in which of at least partial areas a directional vector of said line segment is included, said at least partial areas being obtained by dividing said two-dimensional plane by at least one straight line passing through an origin of said two-dimensional plane;

an error discrimination condition memory for storing one of first and second error discrimination conditions in such a manner that one error discrimination condition is stored for each one of said at least two partial areas, said first error discrimination condition being that when a DDA error item is not less than 0.5, a carry-up is performed, and said second error discrimination condition being that when the DDA error item is greater than 0.5, a carry-up is performed, said error discrimination condition memory being set by said data processing system;

a partial area memory connected to said data processing unit for storing a partial area which is determined by said data processing unit and in which the directional vector of said line segment is included;

a selector controlled by an output of said partial area memory so as to select one of a plurality of error discrimination conditions stored in said error discrimination condition memory; and a DDA unit receiving said DDA parameter generated by said data processing unit so as to sequentially calculate a coordinate (Xn, Yn) of each dot position of an approximate line segment on a discrete coordinate system, said DDA unit determining the coordinate (Xn, Yn) of the dot position in accordance with the error discrimination condition supplied through said selector when the DDA error item becomes 0.5.

2. A line segment depicting system claimed in claim 1 wherein said partial areas are octants obtained by dividing an XY coordinate system by four straight lines expressed by $X=0$, $Y=0$, $Y=X$, and $Y=-X$.

3. A line segment depicting system claimed in claim 2 wherein said error discrimination condition memory is formed of a 8-bit register.

4. A line segment depicting system comprising:

a display memory including a number of memory cells for storing image information corresponding to, in one-to-one relation, discrete coordinate points ($X_N$, $Y_N$) positioned at equal intervals on a two-dimensional plane;

a depicting unit for reading and writing memory cells at any location in said display memory, said depicting unit capable of designating a position of the memory cell to be read or written by using said discrete coordinate points ($X_N$, $Y_N$);

a data processing unit receiving from a data processing system start point coordinates ($X_S$, $Y_S$) and end point coordinates ($X_E$, $Y_E$) for defining a line segment on said two-dimensional plane, said data processing unit generating a Digital Differential Analyzer (DDA) parameter, and determining in which of eight octants of the two-dimensional plane a directional vector of said line segment is included, by action of three large-and-small comparison operations $\{X_E-X_S\}$, $\{Y_E-Y_S\}$ and $\{|X_E-X_S| - |Y_E-Y_S|\}$, where said octants are obtained by dividing an XY coordinate system by four straight lines which pass through an origin of said two-dimensional plane and which lines are expressed by $X=0$, $Y=0$, $Y=X$, and $Y=-X$;

an error discrimination condition register of 8 bits for storing one of first and second error discrimination conditions of 8 bits, each of said 8 bits of each of said first and second error discrimination conditions corresponding to a corresponding one octant of said eight octants, a first logical level of each of said 8 bits indicating that when a DDA error item is not less than 0.5, a carry-up is performed, and a second logical level of each of said 8 bits, complementary to said first logical level, indicating that when the DDA error item is greater than 0.5, a carry-up is performed, said error discrimination condition memory being set by said data processing system;

an octant memory connected to said data processing unit for storing an octant which is determined by said data processing unit and in which the directional vector of said line segment is included;

a selector controlled by an output of said octant memory so as to select one of a plurality of error discrimination conditions stored in said error discrimination condition memory; and a DDA unit receiving said DDA parameter generated by said data processing unit so as to sequentially calculate a coordinate ($X_n$, $Y_n$) of the dot position of an approximate line segment on a discrete coordinate system, said DDA unit determining the coordinate ($X_n$, $Y_n$) of the dot position in accordance with the error discrimination condition supplied through said selector when the DDA error item becomes 0.5.

5. A line segment depicting system claimed in claim 4 wherein said data processing unit determines in which of the eight octants the directional vector of said line segment is included by comparing the result of said three large-and-small comparison operations with the following table:

| XE-XS | YE-YS | \|XE-XS\| − \|YE-YS\| | Octant |
|---|---|---|---|
| + | + | + | 1st octant |
| + | + | − | 2nd octant |
| − | + | − | 3rd octant |
| − | + | + | 4th octant |
| − | − | + | 5th octant |
| − | − | − | 6th octant |
| + | − | − | 7th octant |
| + | − | + | 8th octant |

* * * * *